US009022055B2

(12) United States Patent
Harji et al.

(10) Patent No.: US 9,022,055 B2
(45) Date of Patent: May 5, 2015

(54) ASSEMBLING A CHECK VALVE HAVING A SEAL

(75) Inventors: Bashir Husein Harji, Cottenham (GB); Christopher Mitchelmore, Cottenham (GB); Malcolm Withers, Bar Hill (GB)

(73) Assignee: Cambridge Reactor Design Limited, Cambridgeshire (GB)

( * ) Notice: Subject to any disclaimer, the term of this patent is extended or adjusted under 35 U.S.C. 154(b) by 806 days.

(21) Appl. No.: 13/124,696

(22) PCT Filed: Oct. 16, 2009

(86) PCT No.: PCT/GB2009/051393
§ 371 (c)(1),
(2), (4) Date: Apr. 18, 2011

(87) PCT Pub. No.: WO2010/043913
PCT Pub. Date: Apr. 22, 2010

(65) Prior Publication Data
US 2011/0197978 A1    Aug. 18, 2011

(30) Foreign Application Priority Data

Oct. 17, 2008 (GB) .................................. 0819004.3
Jan. 16, 2009 (GB) .................................. 0900717.0

(51) Int. Cl.
*F16K 15/00* (2006.01)
*F16K 15/02* (2006.01)
(Continued)

(52) U.S. Cl.
CPC ......... *F16K 15/025* (2013.01); *Y10T 29/49412* (2015.01); *B25B 27/0028* (2013.01); *B25B 27/26* (2013.01)

(58) Field of Classification Search
CPC ................ B25B 27/0028; B25B 27/26; Y10T 29/49412; F16K 15/025
USPC ............ 137/315.33, 884, 535, 538, 540, 541, 137/15.18, 15.19, 15.17, 512, 528, 511, 137/315.41; 251/900
See application file for complete search history.

(56) References Cited

U.S. PATENT DOCUMENTS 3,209,777 A * 10/1965 Salisbury ................. 137/315.33
3,947,942 A *  4/1976 Blocker .................... 137/315.41
(Continued)

FOREIGN PATENT DOCUMENTS

EP    0419056 A1    3/1991
GB    2408561 A     1/2005
GB    2408561 B     1/2006

OTHER PUBLICATIONS

International Search Report published Apr. 22, 2010 for International Application PCT/GB2009/051393.

*Primary Examiner* — Kevin Lee
(74) *Attorney, Agent, or Firm* — Fleit Gibbons Gutman Bongini & Bianco PL; Martin Fleit; Paul D. Bianco (57) ABSTRACT

An improved valve assembly having an integral single piece housing (1) having an inlet (15), an outlet and defining an inwardly extending wall forming a valve seat (3); a valve member (4) moveable within the housing (1) between a closed position and an open position and a seal (11) to form a fluid tight seal between the valve member (4) and the valve seat (3) when the valve member is in the closed position. The seal (11) also acting to retain the valve member (4) within the housing (1) and in which the housing defining end portions which extend axially away from the valve member (4) at any position of the valve member between the open and closed positions.

18 Claims, 5 Drawing Sheets

(51) Int. Cl.
*B25B 27/00* (2006.01)
*B25B 27/26* (2006.01)

(56) References Cited

U.S. PATENT DOCUMENTS

| | | | |
|---|---|---|---|
| 4,129,145 A | 12/1978 | Wynn | |
| 4,570,669 A * | 2/1986 | Pauliukonis | 137/528 |
| 4,856,555 A * | 8/1989 | Gausman et al. | 137/543.17 |
| 4,862,913 A | 9/1989 | Wildfang | |
| 4,938,254 A | 7/1990 | Gimby | |
| 5,080,133 A * | 1/1992 | Johnson et al. | 251/900 |
| 5,299,598 A | 4/1994 | Quartana, III et al. | |
| 5,349,984 A | 9/1994 | Weinheimer | |
| 5,560,388 A * | 10/1996 | Caldwell | 137/15.15 |
| 5,699,859 A * | 12/1997 | Poirier | 137/315.33 |
| 6,219,896 B1 | 4/2001 | Levy | |
| 6,349,459 B1 | 2/2002 | Dean | |
| 6,981,512 B2 | 1/2006 | Meyer | |
| 7,284,568 B2 * | 10/2007 | Abe | 137/515.5 |
| 7,905,252 B2 * | 3/2011 | Neumann et al. | 137/884 |
| 8,272,112 B2 * | 9/2012 | Leme et al. | 137/315.01 |

* cited by examiner

ASSEMBLING A CHECK VALVE HAVING A SEAL

FIELD OF THE INVENTION

The present invention relates to a valve assembly and particularly to a check valve.

BACKGROUND OF THE INVENTION

Patent specification U.S. Pat. No. 4,862,913 describes a check valve having a valve body confining a valve element. Such valves are intended to be installed into the end of a conduit to inhibit retrograde, i.e. reverse, flow of fluid within the conduit. To ensure that fluid cannot by-pass the valve, a sufficiently strong seal must be formed between the valve body and the conduit. This is achieved by making the valve body slightly larger in diameter than the conduit and forming the conduit from a resiliently flexible material. Consequently, this arrangement is unsuitable for use in systems where the fluids used are corrosive and/or of high temperatures and/or pressures. Additionally it is difficult to integrate these devices into compression fitted systems as the valve's proximity to the end of the conduit leads to damage of the valve when the ferrule is compressed, and also because the conduit is liable to significantly deform when the ferrule is tightened compromising the effectiveness of the seal at the joint. Another example of an insert check valve is part number #110 manufactured by Smart Products Inc. of 675 Jarvis Drive, Morgan Hill, Calif. 95037 USA http://www.smartproducts.com.

Patent specification U.S. Pat. No. 6,981,512 relates to a biased-ball check valve assembly. The central position of the valve ball relative to the conduit's ends lends itself more easily for adaptation with compression fitting systems. However, the ball valve does not provide the necessary protection against reverse flow where precise control of fluid flow is required, such as in gas manifolds and systems for the control of supply/removal of reagents/products in chemical reactors.

SUMMARY OF THE INVENTION

According to the invention there is provided a check valve comprising: an integral single piece housing having an inlet proximate its first end and an outlet proximate its second end, between said inlet and outlet the housing defining an inwardly extending wall forming a valve seat; a valve member moveable within the housing between a closed position and an open position; and a seal to form a fluid tight seal between the valve member and the valve seat when the valve member is in the closed position, said seal also acting as means to retain the valve member within the housing; wherein the check valve comprises means to bias the valve member towards the closed position, and the housing defines end portions which extend axially away from the valve member at any position of the valve member between the open and closed positions.

The invention enables valves to be formed from as few as four separate components which significantly reduces manufacturing cost. Furthermore, the valve can be connected into a system using conventional compression fittings using standard compression fittings and occupies no more space than a plain straight length of pipe work without the valve mechanism being vulnerable to damage during connection of the piping to a pipe fitting. Alternatively the valve can be assembled within a pipefitting.

It is preferred that the valve member comprises retaining means which retains the seal. This may be arranged such that when valve member is in the closed position the seal engages the seal retaining means and prevents removal of the valve member through the inlet of the housing. Using the seal to retain the valve member reduces the number of components simplifying and reducing cost of manufacture.

The valve member may be retained within the housing such as to have a portion housed at an outlet side of the valve seat and a portion housed at the inlet side of the valve seat, preferably arranged so that the means to retain a seal is housed at the outlet side and the means to retain the biasing means housed at the inlet side.

The valve member, which may be formed from a single piece, may define an enlarged portion retaining the seal and a stem retaining the bias means. Preferably the bias means is a spring, e.g. a helical spring, retained over the stem of the valve member.

The seat wall may be tapered such as to define a portion of the housing having a narrowing inner diameter In a preferred embodiment the bias means is retained over a stem of the valve member and between a flange defined by the valve member and the inlet side of the valve seat. In this embodiment said end portions are adapted to be inserted into a compression fitting, a push fit fitting or a solder weld fitting.

For the purposes of this specification the terms 'tube' and 'tubular' include hollow longitudinal members having circular, variable or other cross sections.

Preferably seal-retaining means is included for holding the seal so that the seal can be forced into engagement with the retaining means during assembly of the valve and, when thus retained, prevents removal of the valve member from the housing.

According to a second aspect of the invention there is provided a method of assembling a check valve comprising a housing, a valve member movable between a closed position and an open position, a seal and seal-retaining-means for holding the seal in a position to form a fluid tight seal between the valve member and the housing when the valve member is in the closed position, and a means to bias the valve member towards the closed position; the method comprising the steps of:

a) locating the valve member and means to bias the valve member within the housing;
b) using a guide to guide the seal into a position where it is retained by the seal-retaining means; and
c) removing the guide.

In a preferred embodiment the seal is passed over and guided along the guide, which may takes the form of a rod and held in axial alignment relative to the valve member, into a recess between shoulder on the valve member. A tool may be used to assist the insertion of the seal. Preferably the tool passes substantially around and slides over the guide. The tool may also be provided with means to locate against the valve member such as by a spigot and corresponding recess provided by the guide and valve member.

A limiter may be used to prevent the seal from being pushed beyond the recess. The limiter may be provided by the tool and adapted so as to engage with the housing when the seal is in position. The valve member may also be held in position within the housing a stop which may also be provided with a limiter. The tool and stop can be used in combination to assemble the valve without the need for judgement to ensure the seal is accurately placed, thereby increasing assembly speed.

BRIEF DESCRIPTION OF THE DRAWINGS

The invention will now be described by way of example with reference to the following figures in which.

DETAILED DESCRIPTION OF THE INVENTION

Figure 1A:
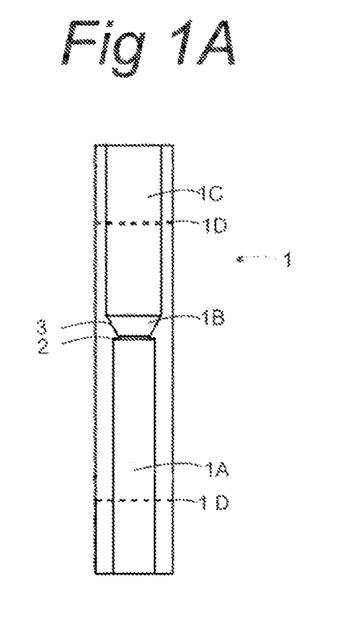
FIG. 1A is a cross sectional side elevation of a tube for holding a valve member.
Figure 1B:
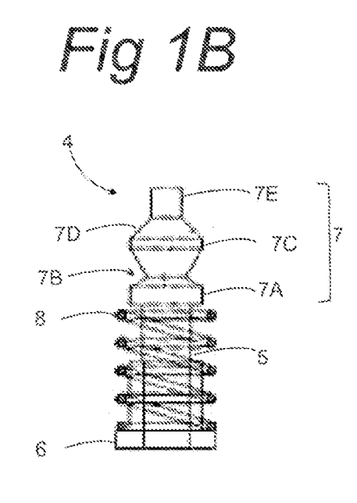
FIG. 1B is a side elevation of a valve member and spring adapted to reside in the tube.
Figure 1C:
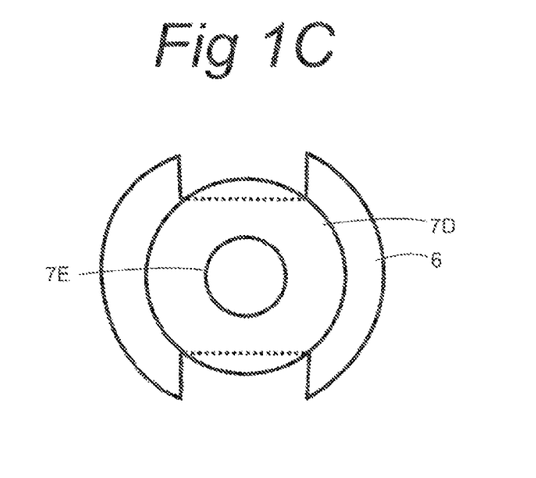
FIG. 1C is a top elevation of the valve member.

FIGS. 1A, 1B and 1C illustrates a tubular conduit 1 made from a single piece of metal such as stainless steel having a substantially uniform outer diameter. The tube bore has a first portion 1A extending from an inlet of the tube at the bottom end as shown on FIG. 1A. The first portion 1A ends at a radial step 2 defining an opening of reduced diameter as compared with the conduit portion 1A. This opening communicates with a second bore portion 1B having a widening diameter so as to define a conical valve seat 3. The second portion 1B leads into a third bore portion 1C having a diameter greater than that of the first portion 1A. The third portion 1C of the bore leads to an outlet at the top of the tube as shown on FIG. 1A.

The first and third portions 1A, 1C extend sufficiently far from the step 2 and seat 3 respectively so to allow end parts of the tube as indicated by broken lines 1D to be inserted into a compression fitting.

The various diameters of the bore and seat/step features can be formed by machining out, e.g. boring or counterboring a solid metal rod or tube.

Referring to FIGS. 1B and 1C there is shown a valve member 4. The valve member 4 has a flange 6 and a head 7 at opposite ends of a stem 5. The head 7 includes an enlarged part 7A, an intermediate part 7C and spigot 7E. Between parts 7A and 7C lies a groove 7B formed by approaching conical shoulders which acts as a retainer for an O-ring seal (not shown in FIG. 1). On the other side of the part 7C, a tapered part 7D leads into the spigot 7E. A helical spring 8 sits over the stem 5 and against the flange 6.

Figure 2A:
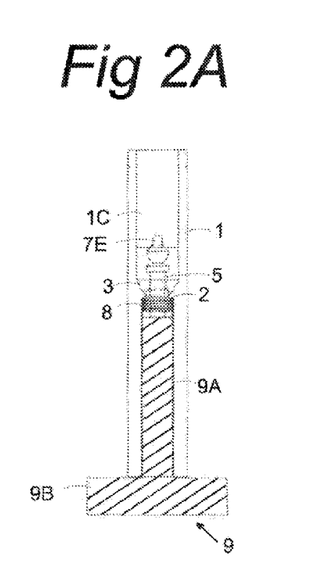
FIGS. 2A, 2B and 2C are partial cross section views showing stages of assembly of a check valve.
Figure 2B:
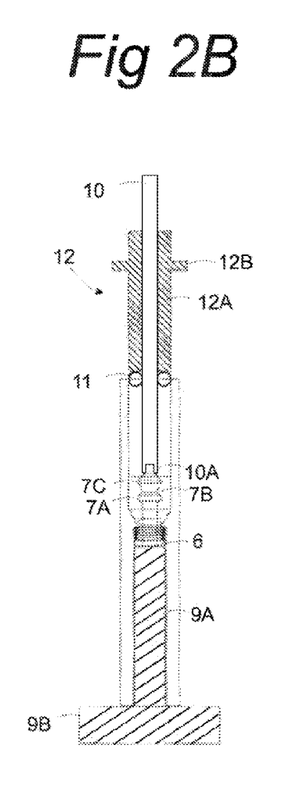
Figure 2C:
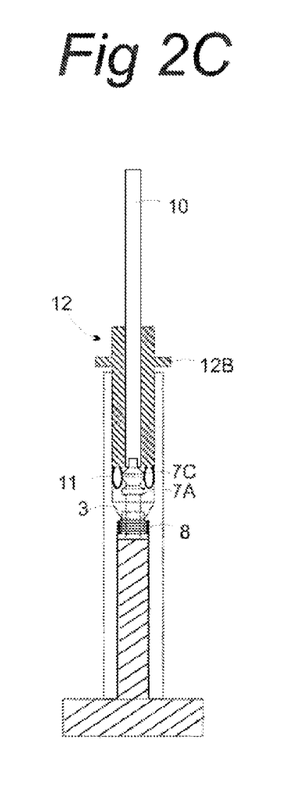

During assembly of the valve as illustrated in FIGS. 2A, 2B and 2C, the valve member 4 is placed head first into the inlet of the conduit 1 and moved to position such that the spring 8 is held and compressed between the flange 6 and step 2 with the head 7 protruding past the seat 3 and into the third portion 1C as shown in FIG. 2A. The maximum diameter of the head is marginally smaller than the opening of the valve seat 2 so that it can pass through the latter during assembly.

The valve member 4 is moved to and maintained in this position with the aid of backstop 9. The backstop 9 comprises a shaft portion 9A having a diameter similar to that of the flange 6 so as to provide good support for the valve member 4, and a stop 9B spaced from the free end of the shaft 9A such that the stop 9B abuts against the end of the conduit 1 when the valve member 4 is in the required location. The position is as shown in FIG. 2A Whilst the valve member 4 is held in this position, a guide rod 10 is inserted into the outlet of the tube 1. A recess 10A in the end of the guide rod 10 receives the spigot 7E so as to hold the guide rod in axial alignment with the valve member 4. An O-ring seal 11, formed from resiliently flexible plastics material, is located over the free end of the guide rod 10. The position is now as shown in FIG. 2B. Using a tool 12, the O-ring is pushed along the guide rod 10 onto the head 7. It is then stretched by the action of the tool 12, over the intermediary portion as shown in FIG. 2C, and retained in groove 7B. During this action the O-ring may be squashed between the part 7C and the bore 1C, this is shown exaggerated in FIG. 2C. The insertion tool 12 has a shaft 12A with a bore which allows the shaft 12A to be passed with a sliding fit over guide 10 and into portion 1C behind the O-ring 11.

To prevent the tool 12 from accidentally pushing the O-ring beyond the groove 7B and onto the enlarged portion 7A or stem 5, the tool 12 is provided with a limiter 12B which is located at a position spaced from the free end of the shaft 12A such as to engage with the end of the conduit 1 when the O-ring is between the shoulders 7B. With the O-ring 11 now in place, the tool 12, guide 10 and back stop 9 are removed from the tube 1 allowing the spring 8 to extend causing the head 7 to move into the portion 1B and the O-ring 11 to be compressed between the shoulders of the groove 7B and seat 3 effecting a fluid tight seal and preventing the valve head 7 from passing back through the opening in the valve seat 3.

It will be understood that, for the limiter 12A and stop 9B to perform their functions, the length of the shafts 9A, 12A and positions of the stops 9B 12B must be selected corresponding to the length of the conduit 1, valve member 4 and relative position of the seat 2 within the conduit 1.

Figure 3:
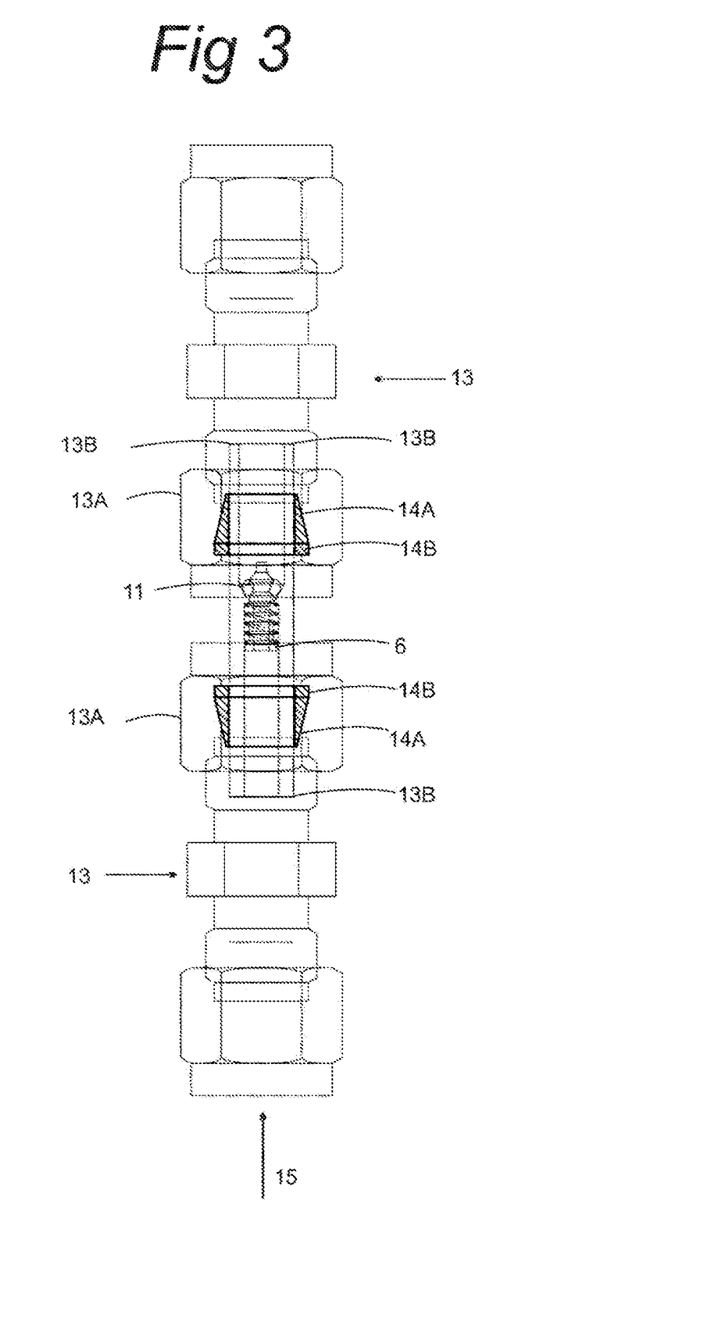
FIG. 3 is a partial cross-section transparency of the assembled check valve in a closed position connected at either end to compression fittings.

In FIG. 3 the conduit 1 with assembled valve is shown connected to compression fittings 13. Compression nuts 13A and two part ferrules each comprising a front ferrule 14A and back ferrule/olive 14B (though a single part ferrule may equally be used) are passed over each end of the tube 1. The first and second ends are inserted into the fitting 13 so as to abut against seats 13B and then the compression nuts are tightened about the tube such that the front ferrule 14A deforms and crimps the tube causing a fluid tight seal and slight deformation of the tube. The deformation is not visible in the figure but it can be seen that the first and third portions 1A, 1C are sufficiently long that that the ferrules can be tightened about their ends without causing deformation in the region of the valve member 4 or O-ring 11.

In use, pressure from fluid flow from the inlet, indicated by arrow 15 urges the valve member 4 to move in the direction of fluid flow, compressing the spring 8 and opening the valve. When fluid flow from the inlet subsides, the spring will causes the O-ring 11 to re-engage with the seat 3 re-effecting the seal.

In an alternative embodiment, the conduits could also be joined by other means such as push fit fittings and solder joints. In the latter case, the distance of the valve member 4 from the ends of the conduit may reduce any damage that could be caused to the components from the application of heat used to solder the joint.

Figure 4A:
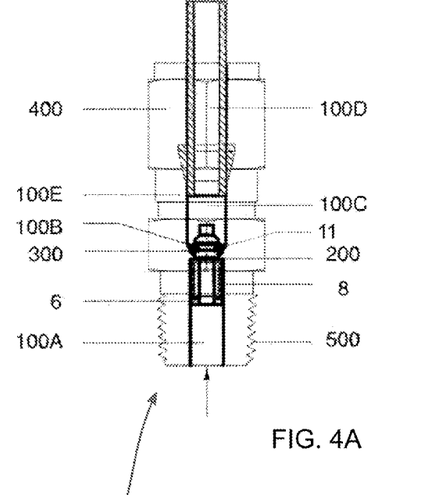
FIGS. 4A & 4B are top elevation transparencies of a pipe fitting housing a check valve in two possible orientations.
Figure 4B:
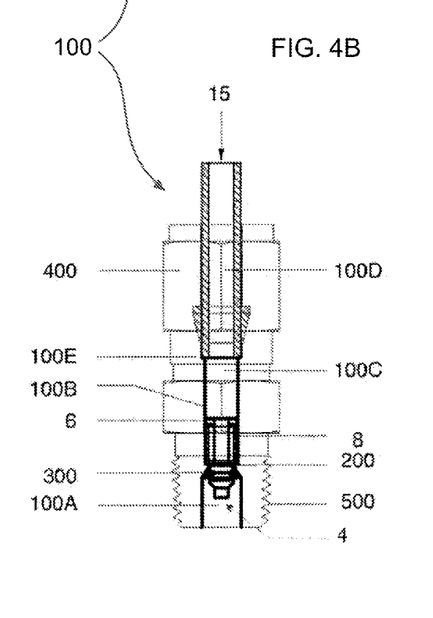

FIGS. 4A and 4B illustrate alternative embodiments of the invention in which the valve as described above is incorporated into a pipe fitting. In each case arrows 15 indicate direction of intended fluid flow. The fitting 100 defines external screw threads 500 at one end and has compression fitting nut 400 at the other end. The body of the fitting 100 defines a bore for housing the check valve and allowing the passage of fluid through the fitting. The bore defines portions 100A in which spring 8 is housed, narrowing portion 100B and portion 100C in which the head of the valve member is housed. As with the previous embodiments, the internal wall of the bore defines a step 200 and a valve seat 300. The seal 11 and valve member 4 are assembled within the pipe fitting using the method previously described. Portion 100C leads into wider bore portion 100D by way of step 100E. Portion 100D is sized to receive piping into and for connection with the compression fitting 400. Step 100E limit the extent of insertion of piping so as protect the valve member 4 from over insertion. FIG. 4B illustrates a fitting which is similar but in which portions 100A, 100C and step 200 and seat 300 have been formed in alternative positions to allow the valve member to be held in a reverse orientation.

Figure 5:
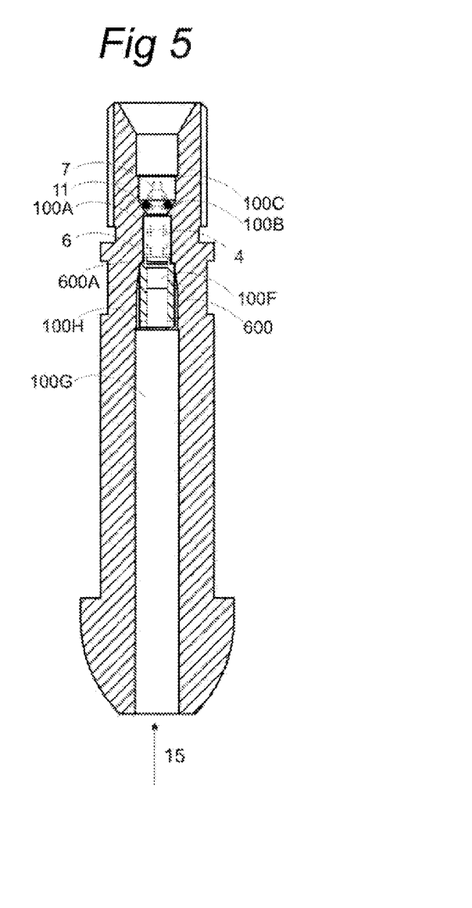
FIG. 5 is a cross section of a further alternative embodiment in which the housing takes the form of a gas bottle adaptor.

FIG. 5 illustrates an embodiment in which the valve assembly is housed within a bull nose bottle adapter. Such adaptors are commonly used for the connection of gas cylinders to pipe systems. In a variation to the above examples the first portion 100A communicates with a wider bore 100F which in turn communicates with a widest portion 100G which extends to the inlet. Portion 100F is formed with threaded internal wall 100H. Portion 100A is of sufficient length to house spring 8 and flange 6 (shown ghosted) when the valve member 4 is in the closed position. Also shown is a retainer 600 having an outer threaded wall and a flange portion 600A which extends axially from the inner diameter portion of the retainer 600.

The method of assembly follows that substantially as described above with the addition that once the seal 11 has been mounted onto head 7, retainer 600 is inserted flange 600A first into the inlet, brought to portion 100F and rotated so that the outer threaded wall of the retainer 600 engages with the corresponding thread 100H of portion 100F drawing the retainer 600 towards portion 100A and securing it against portion 100F. The thickness of the retainer wall 600 is such that when secured, flange 600A protrudes into portion 100A. The retainer 600 is of use where the valve is used in systems operating at high pressures (e.g. 200 bar and over) to prevent dislodgement of the poppet.

It is envisaged that the above described method and valve arrangement could equally be adapted into housings forming other types of pipe fittings such as push fit fittings.

Figure 6:
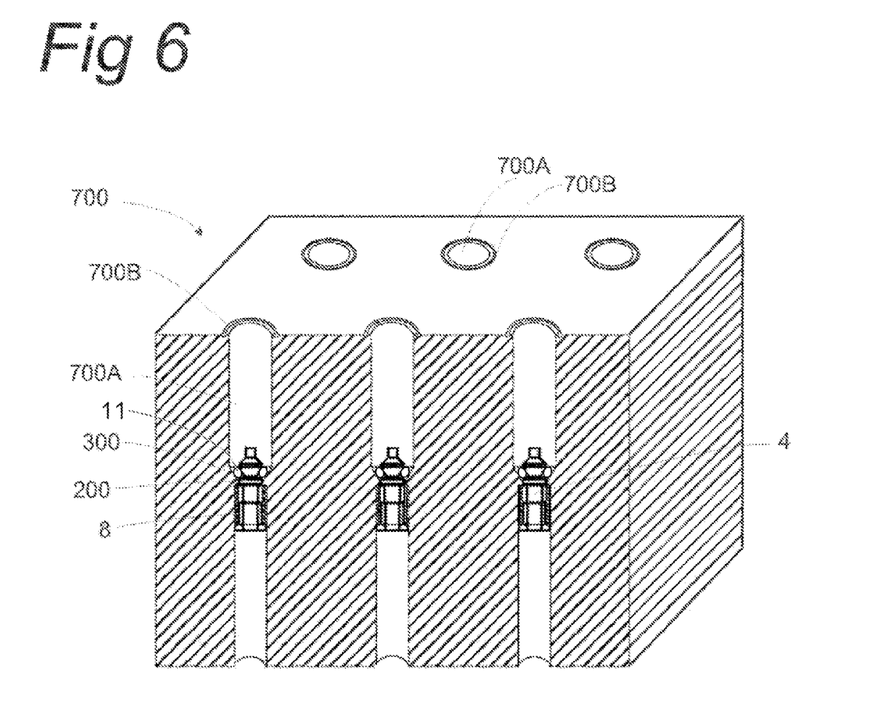
FIG. 6 is a cross section perspective of a block housing a number of conduits each having a check valve.

FIG. 6 illustrates a further embodiment of the invention in which a series of bores 700A, in this embodiment six bores, are formed within a block or plate structure 700. Each bore 700A extends from a top surface of the block to bottom surface (as oriented in the illustration) and defines a valve seat 300 and step 200 about which a valve member 4 is held (shown without 'O' ring attached). Block or plate 700 is intended to be used in conjunction with a second component (not shown) adapted to be placed against block 700 and having passages which communicate with passageways 700A one-to-one so as to form an extension thereto. Alternatively the component may define a more complex relationship e.g. so to provide communication between multiple passages 700A or to a plenum so as to form a manifold structure. Grooves 700B formed in the top surface of block 700 may be used to retain seals in order to provide a fluid tight seal between block 700 and the further component.

It is believed that the illustrated embodiments provides a check valve suitable for situations where it is required to provide a high reliability seal against reverse flow even in systems where the fluids used are corrosive and at high temperatures and pressures.

It is emphasised that the illustrated embodiments are described only by way of example and that many variations are possible within the scope of the accompanying claims. For example, the valve member and conduit/housing may be made from materials other than metal, though a metal conduit/housing would be preferable where it to be deformed by a compression fitting. The housing and bores may be formed by moulding techniques. In a further alternative the guide may be provided with a spigot or other protrusion and the valve member be provided with a recess instead of the reverse arrangement described. In another variation, the seal may be adapted to be held on the fixed valve housing rather than the movable valve stem. In such an arrangement, a tool, equivalent to the tool 12 would be used to manipulate the seal into its operational position where it is retained on the valve housing, seals against the valve member, and prevents withdrawal thereof during operation.

The invention claimed is:

1. A method of assembling a check valve comprising a housing, a valve member movable between a closed position and an open position, a seal and seal-retaining-means for holding the seal in a position to form a fluid tight seal between the valve member and the housing when the valve member is in the closed position, and a means to bias the valve member towards the closed position; the method comprising the steps of:
   a) locating the valve member and means to bias the valve member within the housing;
   b) using a guide to guide the seal into a position where it is retained by the seal-retaining means; and
   c) removing the guide.

2. A method according to claim 1 wherein the seal is passed over and guided along the guide.

3. A method according claim 1 wherein the seal is guided into a recess between shoulders on the valve member.

4. A method according to claim 1 wherein the guide is held in axial alignment relative to the valve member by a spigot which locates within a recess of corresponding size.

5. A method according to claim 1 wherein a tool is used to push the seal along the guide and into position.

6. A method according to claim 1 wherein a limiter is used to prevent the seal being pushed beyond the position.

7. A method according to claim 1 wherein the valve member is inserted into a housing via a first end and held in the open position; the guide is inserted into a second end of the housing and the seal guided into position via the second end.

8. A method according to claim 1 wherein the housing defines two or more passageways each having a valve seat and housing a valve member.

9. A method according to claim 1 wherein at least one end of the housing extends axially away from the valve member at any position of the valve member throughout its range of movement.

10. A method according to claim 9 wherein each end of the housing is adapted to be inserted into a compression fitting.

11. A check valve comprising: an integral single piece housing having an inlet proximate its first end and an outlet proximate its second end, between said inlet and outlet the housing defining an inwardly extending wall forming a valve seat; a valve member moveable within the housing between a closed position and an open position; and a seal to form a fluid tight seal between the valve member and the valve seat when the valve member is in the closed position, said seal also acting as means to retain the valve member within the housing; wherein the check valve comprises means to bias the valve member towards the closed position, and when in use pressure from a flow of fluid from the inlet urges the valve member to move in the direction of fluid flow to open the valve; the housing defines end portions which extend axially away from the valve member at any position of the valve member between the open and closed positions and the valve member includes means for holding a guide rod in axial alignment relative to the valve member for assisting insertion of the seal during assembly of the valve.

12. A check valve according to claim 11 including seal retaining means such that when the valve member is in the closed position the seal engages the seal retaining means and prevents removal of the valve member through the inlet of the housing.

13. A check valve according to claim 11 wherein the valve member is formed from an integral single piece.

14. A check valve according to claim 11 wherein at least one end portion is connected to pipe fitting that deforms the end portion.

15. A check valve according to claim 11 wherein the housing is or forms part of a pipe fitting.

16. A check valve according to claim 11 wherein the housing further comprises a retainer secured to an inside of the housing to restrict movement of the valve member.

17. A check valve comprising an integral single piece tubular housing, a valve member movable within the housing between a closed position and an open position, a seal to form a fluid tight seal between the valve member and the housing when the valve member is in the closed position and a means to bias the valve member towards the closed position; the housing defining end portions each of which is adapted to be inserted into a compression, a push fit or a solder weld connection fitting and which extends away from the valve member at any position of the valve member by a sufficient distance to allow such insertion.

18. A check valve according to claim 17 wherein each end portion is adapted to be inserted into a compression fitting having a ferrule and extends away from the valve member at any position of the valve member by a sufficient distance to allow crimping of the ferrule onto the end portion without causing deformation of the housing in the region of the valve member or the seal.

* * * * *